Aug. 21, 1962 — C. W. COCHRAN — 3,049,781
FASTENING DEVICE
Filed Jan. 6, 1960

Inventor:
Clarence W. Cochran,
by Walter S. Jones
Atty.

United States Patent Office 3,049,781
Patented Aug. 21, 1962

3,049,781
FASTENING DEVICE
Clarence W. Cochran, Belmont, Mass., assignor to United-Carr Fastener Corporation, Cambridge, Mass., a corporation of Delaware
Filed Jan. 6, 1960, Ser. No. 822
1 Claim. (Cl. 24—213)

My invention aims to provide an improved fastener device for any suitable purpose, but preferably for use as a device for holding a hollow molding in place upon a suitable support.

An object of my invention is to provide a molded fastener device preferably made of flexible injection molded plastic material and having opposed attaching legs which are substantially peg like with their axes at angles to each other to act as hooks for drawing the fastener into place upon a support.

A further object of my invention is to provide a fastener device having a flexible base and/or a pair of flexible peg like angled legs for ease of assembly and to provide a continuous pull of the fastener against a support.

Other objects of the invention will, in part, be obvious and will, in part, appear hereinafter.

Figure 1:
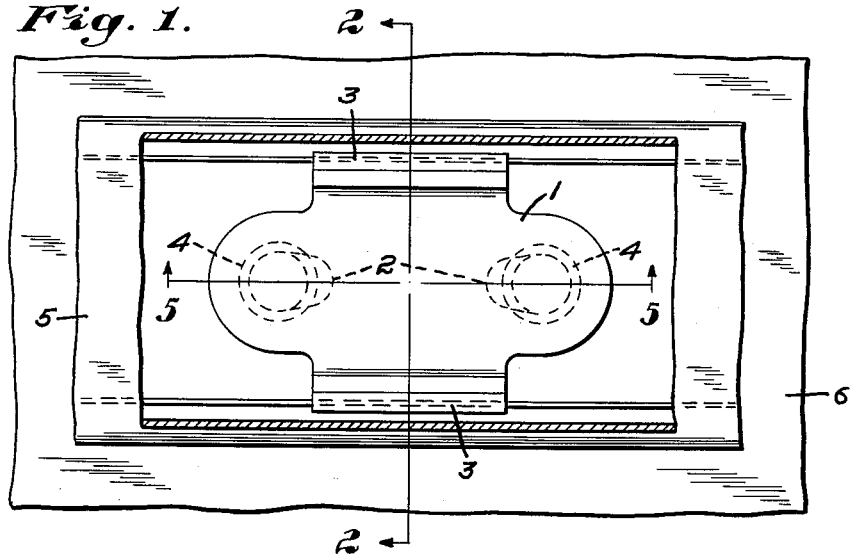
FIG. 1 is an enlarged plan view, partly in section of a preferred fastener installation.

My invention as illustrated by the preferred form, shown in the drawings, is made as a single piece of injection molded flexible plastic and provides a fastener device for moldings and the like installations.

The device illustrated includes a base portion 1, two peg like legs 2—2 extending from the bottom of the base 1, molding engaging portions 3—3 extending from the top side of the base portion 1 and sealing portions 4—4.

Figure 2:
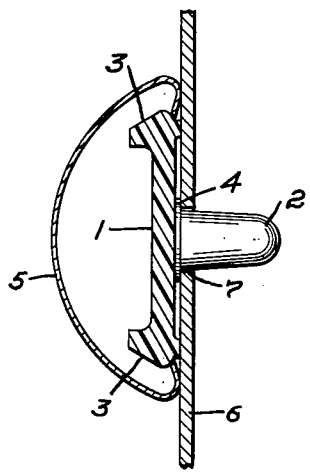
FIG. 2 is a section taken on the line 2—2 of FIG. 1.
Figure 3:
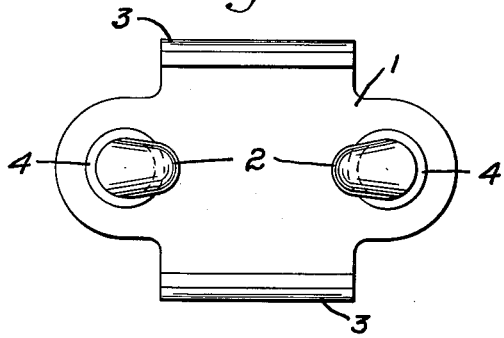
FIG. 3 is a bottom plan view of a preferred fastener device.

An installation of the fastener is shown in FIGS. 1 and 2 and includes the fastener device, a hollow molding 5 and a support 6 having spaced apertures 7—7.

Figure 4:
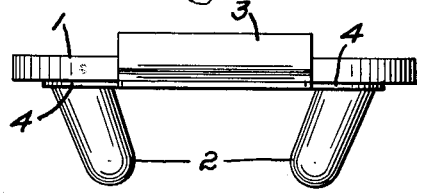
FIG. 4 is an edge view of the device shown in FIG. 3.
Figure 5:
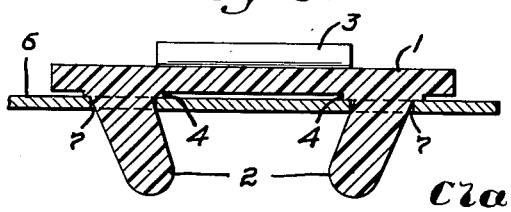
FIG. 5 is a section taken on the line 5—5 of FIG. 1, the molding being omitted.

It will be noted that the legs 2—2 are shown as smooth surfaced round pegs with their axes angled toward each other at their free ends [FIGS. 4 and 5] so that the free ends of the legs 2—2 are closer than the spacing of the legs where they join the base 1.

I prefer to attach my improved fastener to the support 6 by inserting one of the legs 2 into an aperture 7 and then exerting a pull laterally on the fastener to enter the free end of the other leg 2 into the other aperture 7. After the legs 2—2 are entered into the apertures 7—7, the fastener may be pressed toward the support 6 until the base portion 1 seats upon the support and the legs 2—2 enter the apertures 7—7 and assume the positions shown in FIG. 5. During the attaching operation, there is some flexing of the legs 2—2 and some bending of the base portion 1 to permit the attachment. Finally, the hollow molding is snapped over the molding engaging portions 3—3 and the assembly is complete, as shown in FIGS. 1 and 2.

The construction and relation of the various portions of the fastener are such that any outward pull on the molding 5, relative to the support 6, will cause the legs 2—2 to make a tight grip with the support and resist pulling free accidentally, as will be understood by anyone skilled in the art.

My invention is simple in construction, inexpensive to manufacture, very effective as to holding power of the fastener and the sealing portions 4—4 [FIG. 5] press tightly over the apertures and surrounding support, thereby sealing the device against the passage of moisture. Thus, I provide a very desirable construction, particularly for use in installations, such as automobile molding installations, that are subject to vibration and moisture.

While I have illustrated and described a preferred embodiment of my invention, the invention is best defined by the following claim.

I claim:

A fastener device formed as a single piece of flexible molded plastic, said fastener device having a horizontally single unitary flat base portion and a pair of opposed regular, smooth surface peg like attaching legs extending from an undersurface of said base portion in spaced, symmetrical relation and having their axes in angled directions relative to each other and providing the only means for attaching the fastener device to a support, the free ends of said legs spaced closer together than the distances between the legs where they join the base portion and said free ends being adapted to move away from each other to allow the legs to enter apertures in a support spaced the same distance as the legs where they join the base portion.

References Cited in the file of this patent

UNITED STATES PATENTS

| 2,147,943 | Churchill | Feb. 21, 1939 |
| 2,460,722 | Waara | Feb. 1, 1949 |
| 2,533,799 | Haydu | Dec. 12, 1950 |
| 2,643,433 | Scott | June 30, 1953 |

FOREIGN PATENTS

| 533,627 | Italy | Sept. 24, 1955 |
| 745,788 | Great Britain | Feb. 29, 1956 |